(12) United States Patent
Wang et al.

(10) Patent No.: US 9,530,240 B2
(45) Date of Patent: Dec. 27, 2016

(54) METHOD AND SYSTEM FOR RENDERING VIRTUAL VIEWS

(71) Applicant: Disney Enterprises, Inc., Burbank, CA (US)

(72) Inventors: Oliver Wang, Burbank, CA (US);
Simone Croci, Burbank, CA (US);
Marvin White, Burbank, CA (US);
Aljoscha Smolic, Burbank, CA (US);
Michael Gay, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 439 days.

(21) Appl. No.: 14/023,168

(22) Filed: Sep. 10, 2013

(65) Prior Publication Data

US 2015/0070346 A1    Mar. 12, 2015

(51) Int. Cl.
*G06T 15/00* (2011.01)
*G06T 15/20* (2011.01)
*G06T 7/00* (2006.01)

(52) U.S. Cl.
CPC .......... *G06T 15/205* (2013.01); *G06T 7/0083* (2013.01)

(58) Field of Classification Search
CPC .......... G06T 19/00; G06T 17/20; G06T 17/00
USPC .......................................... 345/419
See application file for complete search history.

(56) References Cited

U.S. PATENT DOCUMENTS

| | | | |
|---|---|---|---|
| 2005/0140670 A1* | 6/2005 | Wu et al. | 345/419 |
| 2010/0303303 A1* | 12/2010 | Shen et al. | 382/107 |
| 2013/0016097 A1* | 1/2013 | Coene et al. | 345/419 |
| 2013/0208098 A1* | 8/2013 | Pujol Alcolado et al. | 348/47 |

OTHER PUBLICATIONS

Chan et al, The Design and Construction of a Movable Image-Based Rendering System and Its Application to Multiview Conferencing, Dec. 3, 2010, J Sign Process Syste (2012) 67, pp. 305-316.*
Ve Vylder et al, 2D Mapping of Strongly Deformable Cell Nuclei, Based on Contour Matching, Mar. 29, 2011, International Society for Advancement of Cytometry, pp. 580-588.*
Fusiello et al, Quasi-Euclidean Uncalibrated Epipolar Rectification, 2008, Dipartimento di Informatica, University of Verona (IT), pp. 1-7.*
Geys et al, Hierarchical coarse to fine depth estimation for realistic view interpolation, 2005, Proceedings of the Fifth International Conference on 3-D Digital Imaging and Modeling (3DIM'05) IEEE, pp. 1-8.*
Hartley et al, Multiple View Geometry in computer vision, 2004, Cambridge University Press, second edition, pp. 1-673.*
Inamoto et al, Intermediate View Generation of Soccer Scene from Multiple Videos, 2002 ICPR IEEE, pp. 1.4.*

(Continued)

*Primary Examiner* — Yingchun He
(74) *Attorney, Agent, or Firm* — Fay Kaplun & Marcin, LLP

(57) ABSTRACT

A method including receiving a first image of a scene captured from a first perspective, the first image including an object and a background; segmenting the first image to extract a first two-dimensional contour of the object; approximating a plurality of three-dimensional locations of a plurality of points on the first contour; generating a three-dimensional billboard of the object based on the three-dimensional locations; and projecting the first image onto the three-dimensional billboard.

23 Claims, 10 Drawing Sheets

(56) References Cited

OTHER PUBLICATIONS

Liu et al, A Novel Comparison Approach for Tropical Cyclone Satellite Images Using Angle Features, 2005, Proceeding of 18th International Florida Artificial Intelligence Research Society Conference (2005), pp. 1-6.*
Zhou et al, Generalized Time Warping for Multi-modal Alignment of Human Motion, 2012, IEEE Conference on Computer Vision and Pattern Recognition (CVPR), pp. 1-8.*
Frank R. Schmidt et al. "Fast Matching of Planar Shapes in Sub-cubic Runtime", In Proc IEEE 11th Int Conf. Computer Vision, ICCV 2007, pp. 1-6, 2007.*
Minatani et al., "*Face-to-Face Tabletop Remote Collaboration in Mixed Reality*", 978-1-4244-1750-6/07/$25.00 © 2007 IEEE, 4 pps.

* cited by examiner

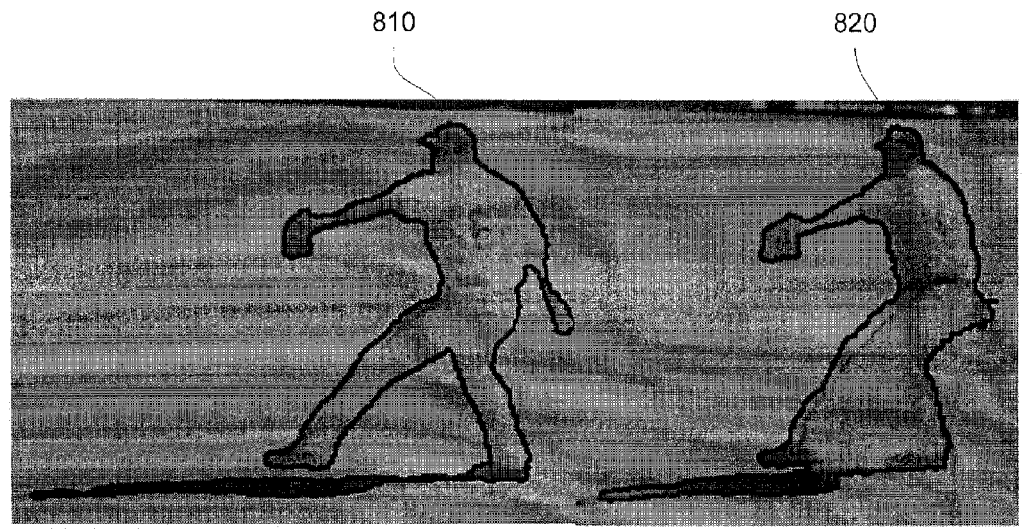
Figure 8A
Figure 8B
Figure 8C

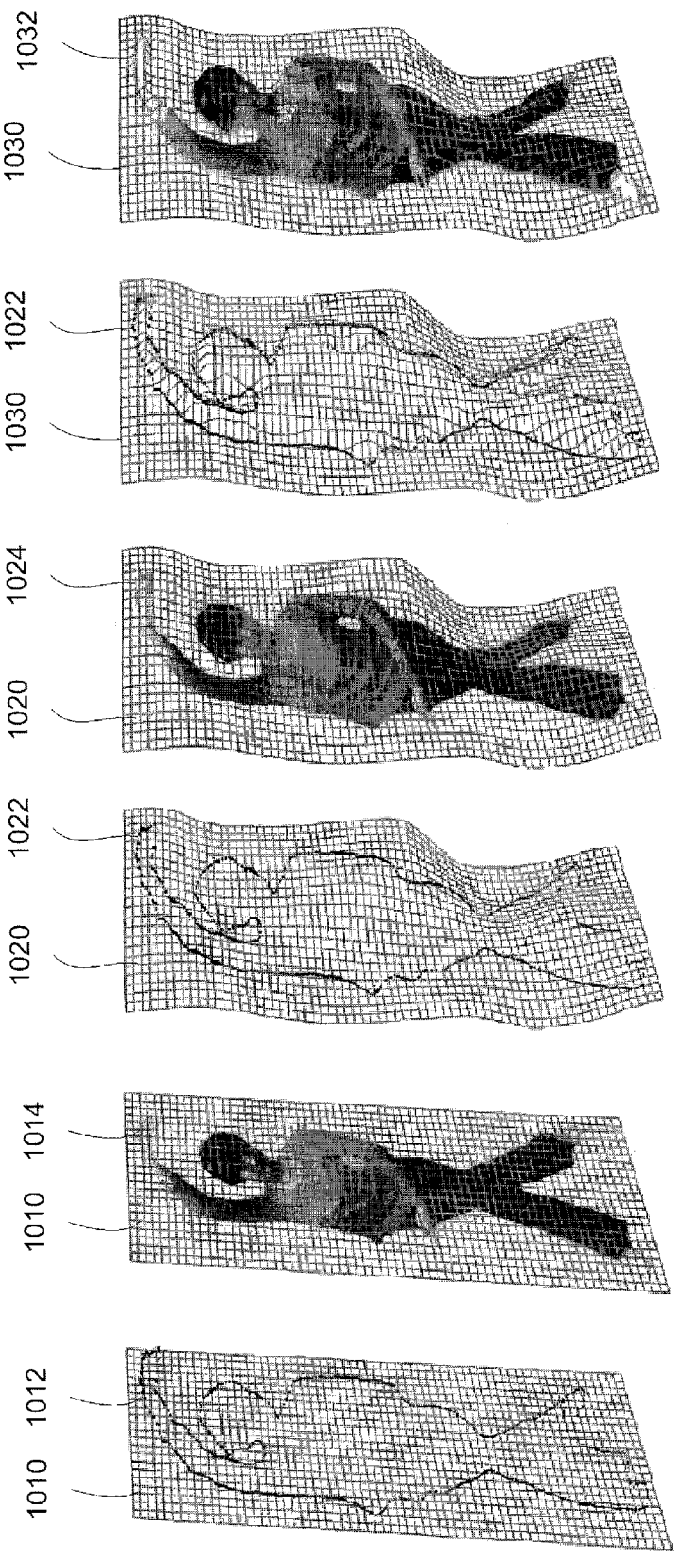

METHOD AND SYSTEM FOR RENDERING VIRTUAL VIEWS

BACKGROUND

Virtual views allow viewers of live or recorded events, such as sporting events, to experience the events from additional viewpoints beyond those from which footage is directly recorded. Virtual views may be computed based on one or more actual views. However, existing techniques for computing virtual views suffer from shortcomings.

One prior technique for generating a virtual view involves the creation of a planar billboard. A planar billboard is a planar surface approximating the location and orientation of a subject, onto which an image of the subject, captured by a physical camera, is projected. A virtual view may then be generated by projecting the planar billboard image on the image plane of a virtual camera, hypothetically positioned to provide the desired view. However, an image projected onto a planar billboard may exhibit distortions when viewed from an angle that is significantly removed from the angle where the image was taken by the physical camera.

Another technique for generating a virtual view involves the creation of a full 3D scene model. If such a model is available, then generating a virtual view simply requires the application of known techniques to project the 3D model into the appropriate image plane of a virtual camera positioned at a desired vantage point. However, the generation of a full 3D model may require more input data than is available, and may also require the application of more computing resources than may be dedicated to the generation of virtual views. The creation of a full 3D scene model may therefore be impractical for common use. It should be noted that, throughout this disclosure, the terms "three-dimensional" and "3D" will be used interchangeably, as will the terms "two-dimensional" and "2D" and the terms "one-dimensional" and "1D".

SUMMARY OF THE INVENTION

A method includes receiving a first image of a scene captured from a first perspective. The first image includes an object and a background. The method also includes segmenting the first image to extract a first two-dimensional contour of the object. The method also includes approximating a plurality of three-dimensional locations of a plurality of points on the first contour. The method also includes generating a three-dimensional billboard of the object based on the three-dimensional locations. The method also includes projecting the first image onto the three-dimensional billboard.

A system includes an image capture apparatus and an analysis apparatus. The image capture apparatus includes a first camera. The first camera captures a first image of a scene from a first perspective. The first image includes an object and a background. The analysis apparatus includes a memory including a set of instructions and a processor executing the set of instructions to perform operations including receiving the first image from the image capture apparatus. The operations also include segmenting the first image to extract a first two-dimensional contour of the object. The operations also include approximating a plurality of three-dimensional locations of a plurality of points on the first contour. The operations also include generating a three-dimensional billboard of the object based on the three-dimensional locations. The operations also include projecting the first image onto the three-dimensional billboard.

A non-transitory computer-readable storage medium stores a set of instructions executable by a processor. When executed by the processor, the set of instructions causes the processor to perform operations including receiving a first image of a scene captured from a first perspective. The first image including an object and a background. The operations also include segmenting the first image to extract a first two-dimensional contour of the object. The operations also include approximating a plurality of three-dimensional locations of a plurality of points on the first contour. The operations also include generating a three-dimensional billboard of the object based on the three-dimensional locations. The operations also include projecting the first image onto the three-dimensional billboard.

BRIEF DESCRIPTION OF THE DRAWINGS

FIGS. 8A, 8B and 8C show an exemplary pair of contours that may be extracted from a shown pair of images, along with contrasting sets of three-dimensional points that may be determined by means of differing executions of the method of FIG. 2 without or with the use of an exemplary speed filtering technique.

FIGS. 10A, 10B, 10C, 10D, 10E and 10F show various billboards, together with images projected thereon, that may be determined based on the same set of input images.

DETAILED DESCRIPTION

Figure 1:
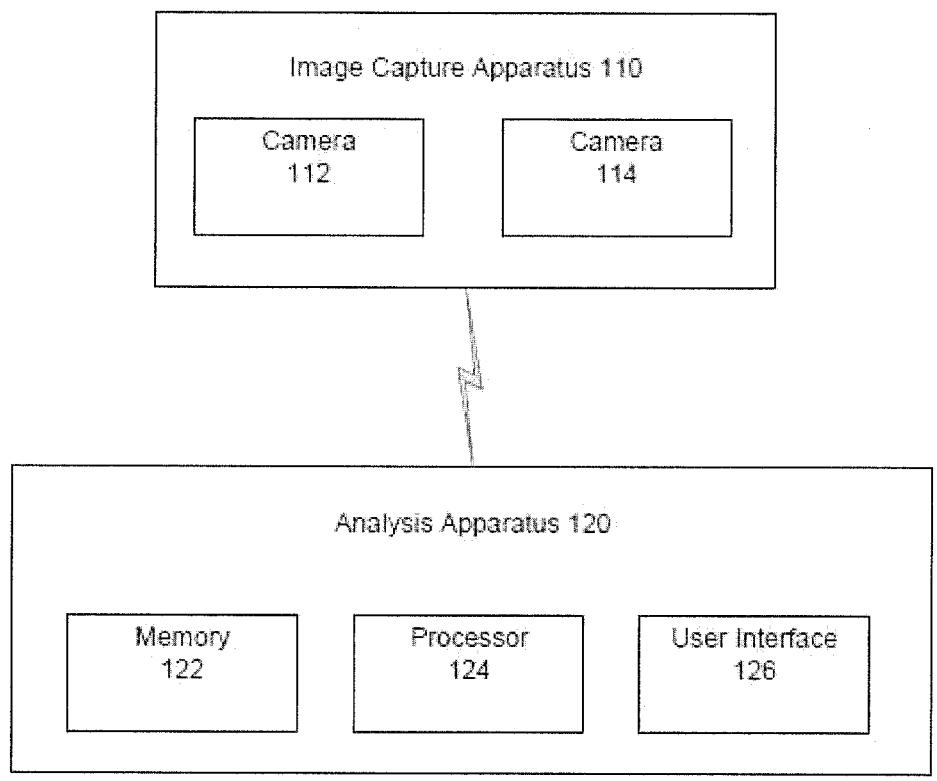
FIG. 1 shows a schematic view of a system for rendering virtual views according to an exemplary embodiment.

The exemplary embodiments may be further understood with reference to the following description and the related appended drawings, wherein like elements are provided with the same reference numerals. Specifically, the exemplary embodiments relate to methods and systems for rendering virtual views of events that are determined based on one or more actual views.

Virtual views may be desirable for a variety of reasons. Virtual views may enable viewers to experience events from a virtual vantage point where it may be impractical or impossible to place a camera, or simply in order to provide the viewers with a broader selection of vantage points than a broadcaster may feasibly be able to provide. Virtual views may also enable the creation of visually pleasing transitions between fixed cameras, and may enable the generation of multi-view footage for stereo 3D viewing. Techniques exist for generating virtual views, but typically suffer from various shortcomings.

Dynamic time warping (referred to herein as "DTW") is a known technique for aligning two signals. DTW has been used for applications such as speech processing, registering coastlines, and handwriting recognition. The exemplary embodiments are described hereinafter with specific reference to the use of DTW, as described above, to align contours of a subject from two camera perspectives. The aligned contours are then used in the exemplary embodiments to generate a three-dimensional billboard of the subject, rather than the planar billboard described above, onto which images from the camera are projected. However, it will be apparent to those of skill in the art that the use of two camera views is only exemplary, and that other numbers of cameras may be used. In one alternative embodiment, a single camera view may be used, together with one or more constraints (e.g., the subject is aligned vertically, the subject borders a known surface such as having at least one foot on the floor) to generate a contour and estimate its position in 3D space. It will be further be apparent to those of skill in the art that DTW is only one technique by which two contours may be aligned, and that other solution techniques may be utilized without departing from the broader principles outlined by the exemplary embodiments.

FIG. 1 illustrates a schematic view of a system 100 for generating virtual views according to an exemplary embodiment. The system 100 illustrates a computerized implementation of the exemplary embodiment in which the method 200, which will be described below, is embodied in lines of code that may be stored in a memory and executed by a processor to cause the processor to execute the steps of the method 200. The system 100 includes an image capture apparatus 110 capturing input images for use in generating virtual views. In the exemplary embodiment, the image capture apparatus 110 includes cameras 112 and 114 capturing images (e.g., video) of the same area (e.g., a playing field of a sporting event being broadcast by a television network covering the sporting event).

The cameras 112 and 114 may be manually operated by camera operators, may be operated automatically (e.g., by means of a computerized mechanism for training the cameras on an area of interest), or may be fixed at a given perspective. In one exemplary embodiment, the cameras may be positioned in a stereo setup; in such a setup, the silhouettes of a same subject captured by the cameras 112 and 114 may be sufficiently similar to provide for advantageous performance of the method 200. The specific positioning of cameras 112 and 114 may vary among differing embodiments, and may typically be determined based on prior knowledge of the event being captured by the cameras 112 and 114. In one embodiment, the cameras 112 and 114 may be positioned to view and frame the relevant part or parts of the area being captured. In another embodiment, the cameras 112 and 114 may be positioned in order to be unobtrusive to in-person viewers of the event being captured by the cameras 112 and 114. In another embodiment, the cameras 112 and 114 may be positioned in order to simplify automatic segmentation of captured images into foreground and background, such as by placing the cameras 112 and 114 such that foreground individuals or objects are likely to be framed by background areas, such as dirt or grass, in the captured images.

The system 100 may also include an analysis apparatus 120 including a memory 122 storing image data captured by the image capture apparatus 110, a program embodying the method 200, and other relevant information. The analysis apparatus 120 may also include a processor 124 executing the program embodying the method 200, as well as a user interface 126 that may enable a user to control, monitor, or otherwise access the execution of the program embodying the method 200 and the data stored in the memory 122. It will be apparent to those of skill in the art that the memory 122, processor 124, and user interface 126 need not be dedicated specifically to the performance of the method 200 or of other tasks relating to virtual views; rather, the analysis apparatus 120 may be a system that is further capable of performing any other tasks commonly known in the art. It will further be apparent to those of skill in the art that the image capture apparatus 110 may be collocated with the analysis apparatus 120 (e.g., onsite at the location of an event being broadcast and having virtual views provided), or may be located remotely from the analysis apparatus 120 (e.g., the image capture apparatus 110 may be onsite at the location of an event, while the analysis apparatus 120 may be disposed at the premises of a broadcaster of the event or at any other appropriate location). In an embodiment where the image capture apparatus 110 is located remotely, data from the image capture apparatus 110 may be transmitted to the analysis apparatus 120 by means of the Internet, a proprietary data network, or any other mechanism capable of such transmission.

Figure 2:
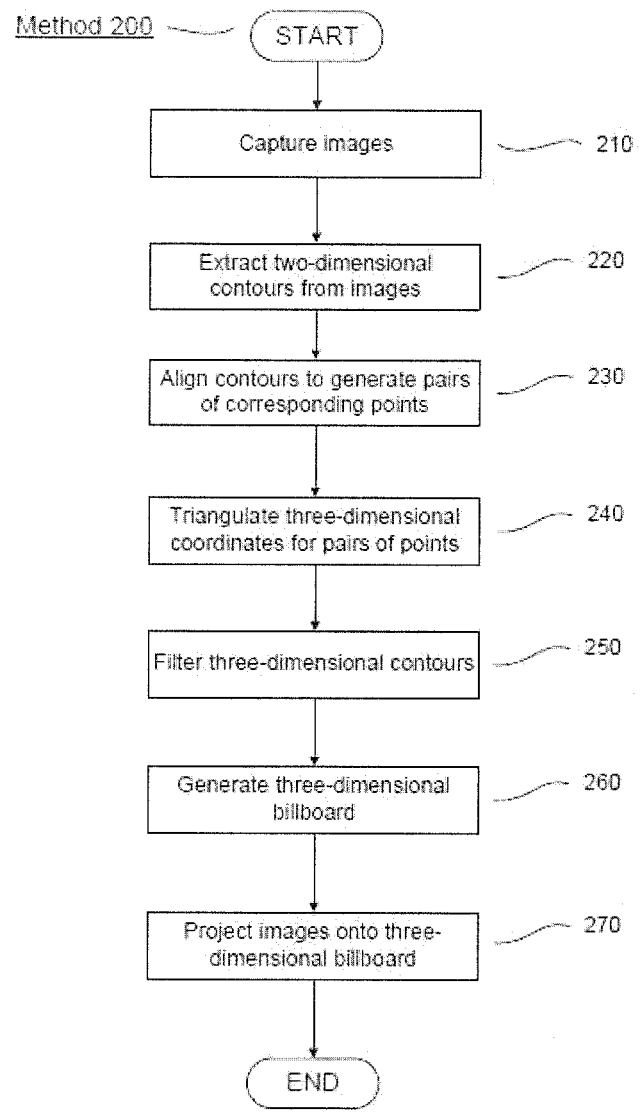
FIG. 2 shows an exemplary method for rendering virtual views described with reference to the exemplary system of FIG. 1.
Figure 3:
FIG. 3 shows an exemplary pair of images that may be captured by the exemplary system of FIG. 1.

FIG. 2 illustrates an exemplary method 200. The exemplary method 200 may be embodied in any number of manners, including a computerized implementation in which the method 200 is embodied in lines of code that may be stored in a memory and executed by a processor to cause the processor to cause the steps of the method 200. In step 210, two input images are recorded by the image capture apparatus 110 and received by the memory 122. The images may be received by the memory 122 at the same time as the event is taking place (e.g., in real time) or on a delayed basis. FIG. 3 illustrates exemplary paired input images 310 and 320. It will be apparent to those of skill in the art that images 310 and 320 illustrate the same subject from differing vantage points. It will further be apparent to those of skill in the art that the images 310 and 320 may be captured by any type of image capture array capable of capturing images consistent with the requirements of the exemplary embodiments.

Figure 4:
FIG. 4 shows an exemplary pair of contours that may be extracted from the exemplary images of FIG. 3 by means of the exemplary method of FIG. 2.

In step 220, two-dimensional contours are extracted from the images 310 and 320 by the processor 124. FIG. 4 illustrates exemplary two-dimensional contours 410 and 420 that may be extracted from images 310 and 320 respectively. This may be performed by known techniques in the art of image analysis, which may typically involve a segmentation of the image to determine which segments are foreground (e.g., players in a sporting event that is taking place in the image) and which are background (e.g., the playing field in the same sporting event), and the creation of an outline around the active segments to form a contour.

In step 230, the contours 410 and 420 are aligned with one another to determine a set of correspondences wherein each point on contour 410 corresponds to a point on contour 420 and vice versa. Conceptually, the contours 410 and 420 may be thought of as rubber bands that have been stretched around the subject to form the silhouette of the subject. Continuing with this analogy, determining correspondences may be thought of as determining where the two rubber bands need to be placed and stretched or compressed such that they align with one another.

As described above, the exemplary embodiments use a technique involving DTW to accomplish this alignment process, but any other appropriate solution method may also be used. The first contour (e.g., contour 410) may be described as $c_1(i_1) \in \Re^2$ where $i_1=1, \ldots, N_1$, and the second contour (e.g., contour 420) may be described as $c2(i2) \in \Re^2$, where $i_2=1, \ldots, N_2$. In these expressions, for example, $c_1(i_1)$ is image coordinates {x,y} in image $I_1$. An alignment $\alpha(k)$ is determined stating, conceptually, that $c_1(\alpha_1(k))$ corresponds to $c_2(\alpha_2(k))$. The alignment $\alpha(k)$ may be expressed as $\alpha(k)=\{\alpha_1(k), \alpha_2(k)\} \in N^2$, where $k=1, \ldots M$, $\alpha_1(k) \in [1, N_1]$, $\alpha_2(k) \in [1, N_2]$, and M can be greater than or less than $N_1$ or $N_2$.

The exemplary embodiment uses a DTW-based solution to find the best alignment between two one-dimensional signals. Given c1 and c2, defined above, as inputs, the exemplary process "unwraps" the contours into one-dimensional ("1D") signals and aligns them using the DTW-based solution that finds the best alignment for the two 1D signals. In this context, "unwraps" means that the pixels forming the contour are removed from their two-dimensional shape and placed sequentially in a line in the same order in which they occur in the contour. For reasons that will be discussed in further detail below, the specific locations at which the contours are broken to form the one-dimensional signals are unimportant, and may be chosen by any convenient matter, such as randomly, because the one of the contours that is duplicated to form a double length contour will have a copy of the full unbroken contour for any starting point. Continuing with the rubber band analogy used above, this may be thought of as cutting each rubber band in one place and placing them alongside one another before stretching or compressing them to find the corresponding points as described above.

For any alignment $\alpha(k)$ of length M, the global "cost" may be computed as:

$$C = \sum_{k=1}^{M} \Phi(c_1(\alpha_1(k)), c_2(\alpha_2(k)))$$

In this expression, $\Phi$ is a cost function associated with two contour points and the minimum cost represents the best possible alignment. One way to align the contours would be to simply compute all possible alignments and calculate the global cost for each. However, it will be apparent to those of skill in the art that this would result in a prohibitive running time. The technique of DTW speeds up the computation by remembering the best possible path up to a current point and building on the best possible path. The exemplary embodiments use a modified DTW technique that will be described after the following review of the basic DTW technique.

Under the basic DTW technique, a best-cost matrix X of size $N_1 \times N_2$ is filled in a scan-line order, where the value of X(u, v) is equal to the minimum of the total cost of the alignment of partial contours $c_1(i_1)$ with $i_1=1, \ldots, u$ and $c_2(i_2)$ with $i_2=1, \ldots, v$. Subsequent values of X(u', v') are then computed by choosing a lowest-cost option from a set of "steps" $\Gamma$, or previous locations in the matrix X where the global cost has already been computed that can be used to compute the current cost. The subsequent cost can be expressed as:

$$\Phi(u',v')=K(c_1(u'),c_2(v'))+\min\{X(u,v)|\{u',v'\}-\{u,v\}\in\Gamma\}.$$

In this expression, the "steps" $\Gamma$ define how the next alignment $\alpha(k+1)$ can vary based on the current alignment $\alpha(k)$. The exemplary embodiment allows alignments to change by zero, one or two steps, that is to say, that a next step in the alignment may progress by one or two points along one or both of the contours. This constraint may be expressed as:

$$\alpha(k) - \alpha(k-1) \in \begin{Bmatrix} \{1, 0\} \\ \{0, 1\} \\ \{1, 1\} \\ \{1, 2\} \\ \{2, 1\} \end{Bmatrix} = \Gamma$$

Once the matrix X has been filled, the cost of the best alignment is found at the matrix entry corresponding to the final points of the two 1D signals $X(N_1, N_2)$. The optimal path can then be traced back through the matrix, and the alignment can be derived from this path.

The above-described technique makes use of a distance function $\Phi(i, j)$. The exemplary embodiments use a function combining two terms that are relevant to the identification of points that "correspond" to one another on two different contours. This expression can be defined as:

$$\Phi(i,j)=d_{patch}(i,j)+\lambda d_{epipolar}(i,j)$$

In this expression, $\lambda$ is a tuning parameter. $d_{patch}$ is a term that defines the distance between two descriptors derived from image patches associated with locations on contours $c_1$ and $c_2$. In other words, this means that two points that appear visually similar in both contours will have a low value for $d_{patch}$. There are many metrics in the art that may be used to measure the distance between two image patches' descriptors. For example, one expression for the distance is:

$$d_{patch}(i_1, i_2) = \sum_{p \in N} \|I_1(c_1(i_1) + p) - I_2(c_2(i_2) + p)\|^2$$

In this expression, $I_1$ and $I_2$ represent the two images being considered, the indices of the $I_1$ and $I_2$ terms represent the pixels in these images, and $p \in N$ are pixel offset coordinates in a neighborhood of size n×n. In the exemplary embodiment, n=5. The second term, $d_{epipolar}$, uses epipolar lines to further help determine the distance of two points from one another. It may be understood by those of skill in the art that a pixel in a still image represents a ray emanating from the image taken at a set angle, but at an undetermined distance. For example, a hypothetical laser beam shining directly into camera 112 will appear on the image taken by camera 112 as a point; the location of the point in the image taken by camera 112 enables the determination of the angle of the origin point of the laser, but not its distance from camera 112. Conversely, the beam of the same hypothetical laser will appear in the image taken by camera 114 as a line projecting across the field of view of camera 114, beginning at the origin point of the laser and ending at camera 112. This line may be termed the epipolar line. The $d_{epipolar}$ term for a pair of points, one in a first contour and another in a second contour, increases as the location of the point in the first image grows further away from the epipolar line in the first image representing the point in the second image. This term is useful for this purpose because points in the two contours that may be similarly located in three-dimensional space will have a low value of $d_{epipolar}$. This term may be expressed as:

$$d_{epipolar}(i_1,i_2)=d_{line}(F_1c_1^h(i_1),c_2(i_2))+d_{line}(F_2c_2^h(i_2),c_1(i_1))$$

In this term, $d_{line}(L, p)$ is the closest distance from point $p=\{p_0, p_1\}$ to the line $L=\{l_0, l_1, l_2\}$, $F_1$ and $F_2$ are the fundamental matrices between the two cameras, and $c_1^h$ and $c_2^h$ are the contour points written in homogeneous coordinates. The distance $d_{line}(L,p)$ may be computed as:

$$d_{line}(L, p) = \frac{|l_0 p_0 + l_1 p_1 + l_2|}{\sqrt{l_0^2 + l_1^2}}$$

Once a matching cost is defined, the processor 124 may be capable of computing the optimal signal alignment using DTW in $O(N_1N_2)$ time. However, one limitation of the basic DTW approach described above is that the starting point $X(1,1)$ requires that $c_1(1)$ and $c_2(1)$ are known, that is, that the contours have known corresponding starting points. One technique to address this limitation is to compute an alignment of the two contours for each starting point $c_1(i_1)$ with $i_1=1, \ldots, N_1$, that is, for each possible starting point in the first contour. However, the running time for such an approach would be $O(N_1^2N_2)$. Instead of adopting such an approach, the exemplary modified DTW technique duplicates one of the in signals. As used herein, this duplication may involve starting with the 1D signal of the contour to be duplicated, making a copy of the 1D signal, and attaching the copy to one end of the original in the same orientation as the original. The 1D signal that has not been duplicated is then aligned to the double-length 1D signal formed by the duplication. Returning to the rubber band analogy, this may be thought of as duplicating one of the cut rubber bands at the end of itself, and aligning the second rubber band with the duplicated rubber band so that the end of the second rubber band naturally aligns with the correct point in the duplicated rubber band, without having to predetermine the correct point. Once one of the contours has been duplicated, the exemplary method involves computing the best alignment over all starting points simultaneously.

This exemplary technique may involve constructing a matrix $X'$ of size $2N_1 \times N_2$ (where $N_1$ is the length of one of the contours, $N_2$ is the length of the other of the contours, and $N_1$ and N2 are interchangeable). Before the matrix $X'$ is filled in a standard row-scan order, special values are assigned for the elements $X'(i,1)$, for $i=1, \ldots, N_1$, simply with $\Phi(i, 1)$. This may result in there being no additional penalty for the optimal path starting at any point in the first column of the matrix $X'$ up to the end of the first wraparound. The minimum path on the right side of the matrix may correspond to the best alignment across all possible starting positions of $c_1$. Further, to ensure that the entire first contour is aligned to the second contour, the exemplary embodiment requires that the height difference from the start point to the end point is exactly $N_1$ steps.

Figure 5:
FIG. 5 shows an exemplary set of correspondences that may be determined for the pair of contours of FIG. 4 by means of the exemplary method of FIG. 2.

The result of the alignment performed in step 230 is a set of correspondences between points in the contour 410 and points in the contour 420. Further, the running time of the exemplary embodiment is $O(N_1N_2)$ rather than the $O(N_1^2N_2)$ running time for calculating all possible starting points. FIG. 5 illustrates the contours 410 and 420 with a set of correspondence lines 510 drawn into the figure, with each of the correspondence lines 510 extending between two points that have been determined to correspond to each other. It will be apparent to those of skill in the art that the quantity of the correspondence lines 510 has been selected for the sake of clarity, and that the number of correspondences may vary, from a maximum of the number of pixels in the contours to a smaller quantity chosen to improve processing times or accuracy of further processing.

Figure 6A:
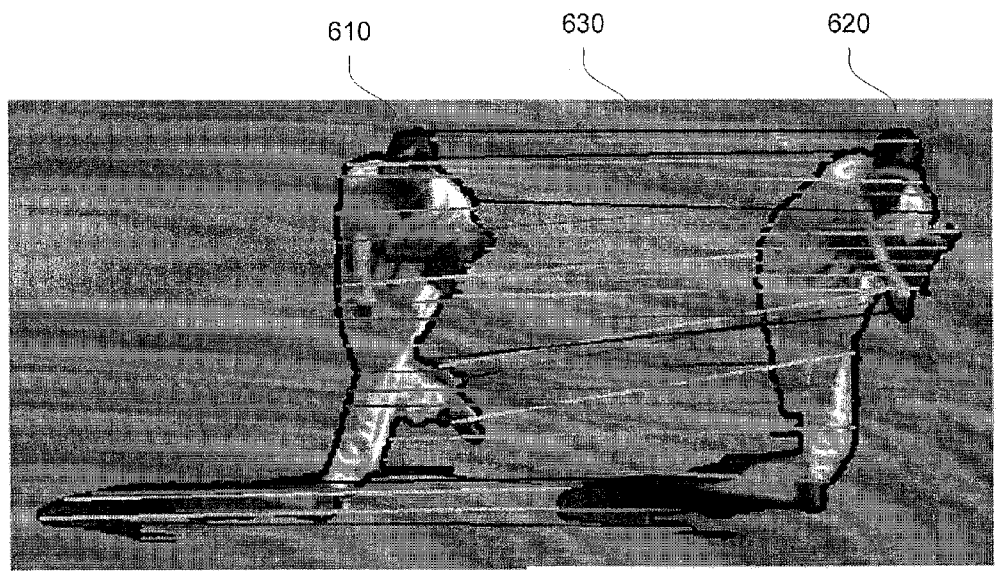
FIGS. 6A and 6B show two contrasting sets of correspondences that may be determined for the same pair of contours by means of differing executions of the method of FIG. 2 using different values of a tuning parameter.
Figure 6B:
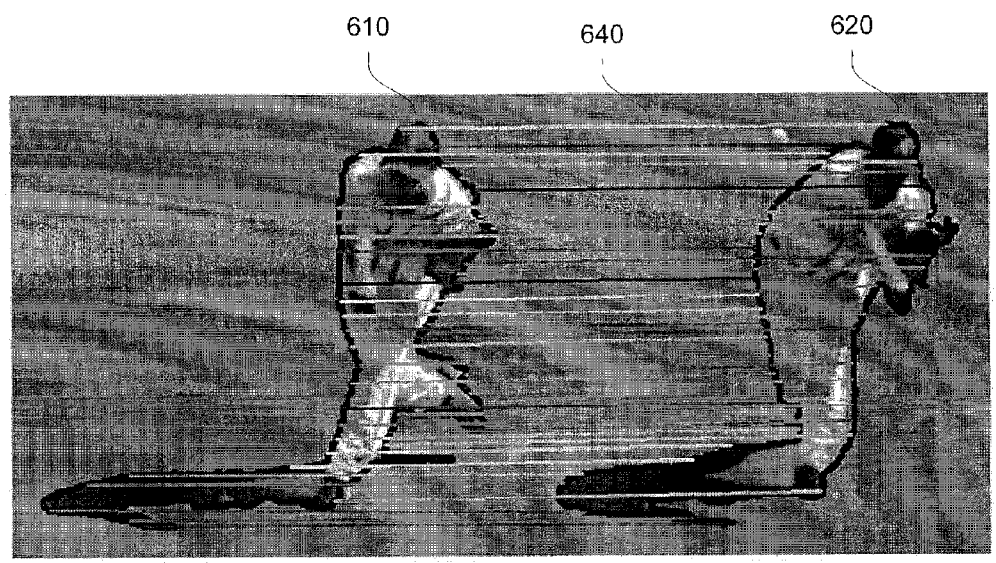

FIGS. 6A and 6B show a further pair of contours 610 and 620 for a different set of input images from those shown above. The set of correspondence lines 630 in FIG. 6A have been determined with a tuning parameter $\lambda=0$, that is, only based on the patch expression that determines whether two points in the contours are visually similar. The set of correspondence lines 640 in FIG. 6B have been determined with a tuning parameter $\lambda=1$ in order to bias the alignment away from pairing points with high epipolar distances. It will be apparent to those of skill in the art that the correspondence lines 640 of FIG. 6B connect to points that are more visually appropriate on contours 610 and 620 than do the correspondence lines 630 of FIG. 6A.

Once the contours 410 and 420 have been aligned, in step 240 the processor 124 triangulates three-dimensional coordinates for each matched pair of points on the contours 410 and 420. It should be noted that the term "triangulate" is used herein to refer to the process of computing the 3D intersections, or near intersections, of lines in 3D space that are back-projected from pixels in the camera images, and that triangulation, as used herein, may refer to any one of several possible methods of using angle measurements, which are one way to regard pixel measurements in calibrated images, to determine 3D positions. The exemplary method 200 will be described with reference to a specific triangulation method; however, those of skill in the art will understand that other methods may be used instead, without departing from the broader principles of the exemplary embodiments.

In step 240 of the exemplary method, for each pair of corresponding 2D contour points (e.g., one point on contour 410 and one point on contour 420, as determined in step 230), a 3D point is obtained by computing the closest point between a bundle of N rays defined by the two corresponding points and their neighboring points. A plurality of rays is used in order to reduce the noise that may result from simply intersecting two corresponding points. It will be apparent to those of skill in the art that the specific quantity N may vary among differing implementations, with a larger quantity providing better results and a smaller quantity providing faster calculations. A ray $r_i$ may be defined as $r_i=a_i+tb_i$. The distance between the ray $r_i$ and a point p may be defined as:

$$d_i = \frac{\|(p - a_i) \times b_i\|}{\|b_i\|}$$

Using the expression $(a \times b) \cdot (a \times b) = \|a\|^2 \|b\|^2 - (a \cdot b)^2$, it may be determined that the square of the distance $d_i^2$ can be expressed as:

$$d_i^2 = \|p - a_i\|^2 - \frac{\|(p - a_i) \cdot b_i\|^2}{\|b_i\|^2}$$

For a quantity N rays $r_i$, where i=1, ..., N, the point p should be selected so that the sum of the corresponding distances $d_i$ is minimized. The sum may be minimized when the derivative $$\frac{d}{dp}\sum_{i=0}^{N} d_i^2$$

is equal to zero. The derivative can be expressed as:

$$\frac{d}{dp}d_i^2 = 2(p - a_i) - 2b_i \frac{(p - a_i) \cdot b_i}{\|b_i\|^2}$$

And based on the above, it can be determined that:

$$\sum_{i=0}^{N} p - a_i - b_i \frac{(p - a_i) \cdot b_i}{\|b_i\|_2} = 0$$

Figure 7B:
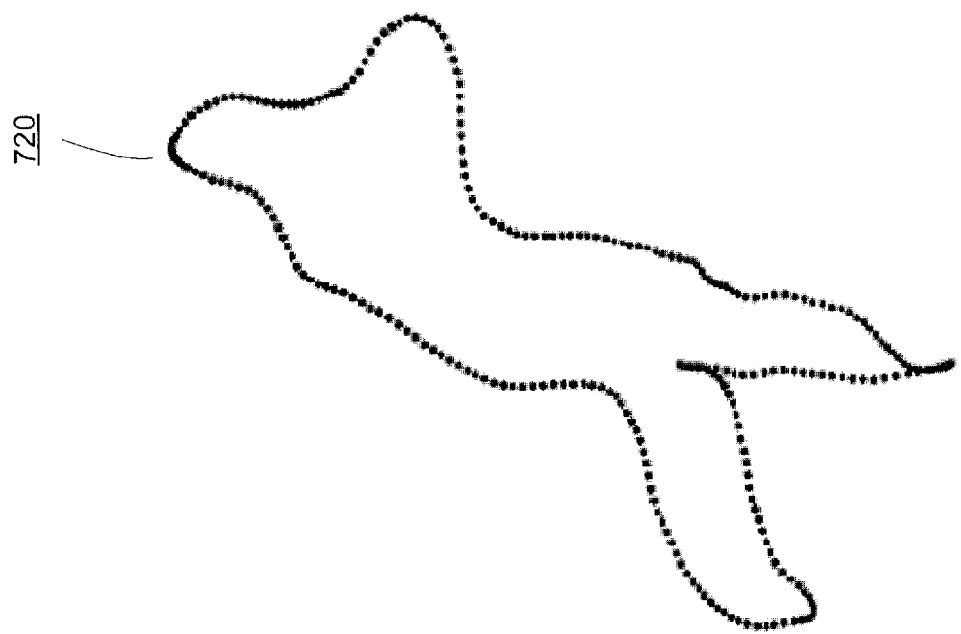
FIGS. 7A and 7B show two contrasting sets of three-dimensional points that may be determined for the same pair of two-dimensional contours by means of differing executions of the method of FIG. 2 using different values of a further tuning parameter.
Figure 7A:

The result of the above expression is three equations with three unknowns, the unknowns being the components of p. The processor 124 then solves the equations analytically to determine the location of each point p. The full set of points that are determined thusly may form a three-dimensional contour. FIGS. 7A and 7B illustrate the results of two different performances of the point triangulation process of step 240 for the same set of correspondences. In FIG. 7A, the set of points 710 has been determined with N=2, that is, based on the use of two rays surrounding each pair of corresponding points. In FIG. 7B, the set of points 720 has been determined with N=10, that is, based on the use of ten rays surrounding each pair of corresponding points. As it may be seen from observing FIGS. 7A and 7B, the use of a larger number of rays results in smoother contours. It may be apparent to those of skill in the art that the value of N may therefore be set as a further tuning parameter, with higher values of N providing for better results and lower values of N providing for faster computation.

In step 250, the three-dimensional contour obtained in step 240 is filtered by the processor 124. The exemplary embodiments are described with reference to two filtering techniques. However, it will be apparent to those of skill in the art that other implementations may use differing types or quantities of filters, including the possibility of using no filtering in order to speed execution or reduce the required computing resources.

The first type of filtering used in the exemplary embodiment may be referred to as "speed filtering". This type of filtering may cope with errors in segmentation due to large difference between the two two-dimensional contours (e.g., those shown in FIG. 4). In this type of region, the alignment may be stationary in one contour while traversing contour points quickly in the other contour. In speed filtering, the slopes of the two contours, $$\left\|\frac{d}{dk}c_1(\alpha_1(k))\right\| \text{ and } \left\|\frac{d}{dk}c_1(\alpha_1(k))\right\|,$$

are examined, and points in regions where either slope is moving too quickly, or where the difference between the two slopes are too big, are filtered out. The term "speed filtering" refers to the fact that this filtering removes points where the alignment is moving too fast.

FIGS. 8A, 8B and 8C demonstrate the effect of speed filtering. FIG. 8A shows a first 2D contour 810 and a second 2D contour 820. It may be apparent that the extracted contours 810 and 820 both recognized the subject's shadow as being part of the subject, and that the contour 820 further failed to recognize the space between the subject's legs as not being part of the subject. FIG. 8B shows an unfiltered 3D contour 830 that may be obtained from 2D contours 810 and 820 through the performance of steps 230 and 240, and FIG. 8C shows the filtered 3D contour 840 that has been subject to speed filtering. It may be apparent that speed filtering results in the removal of large numbers of points near the subject's feet, where the 2D contours 810 and 820 differ greatly.

Figure 9C:
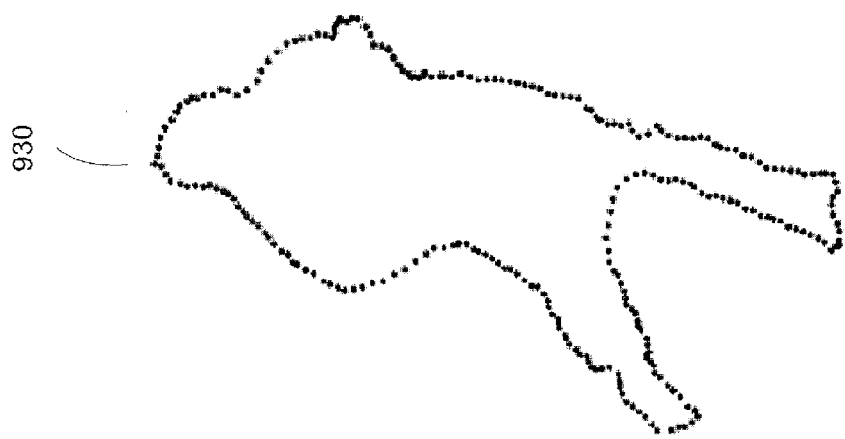
FIGS. 9A, 9B and 9C show three contrasting sets of three-dimensional points that may be determined based on the same input by means of differing executions of the method of FIG. 2 using no image filtering, median filtering, or Gaussian filtering.
Figure 9B:
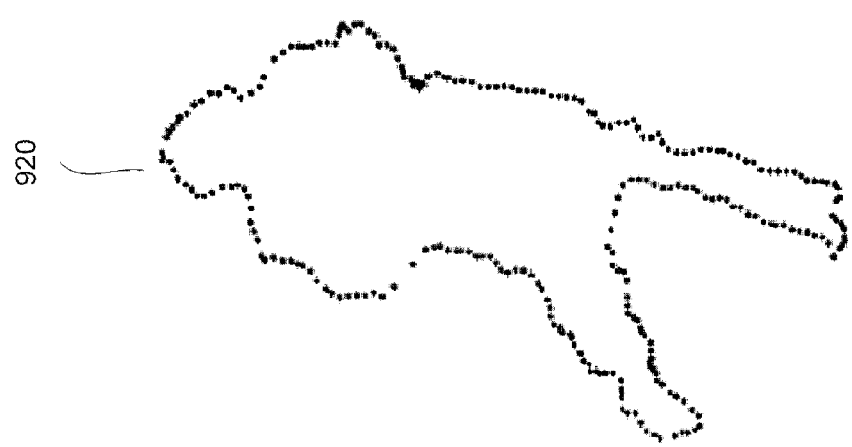
Figure 9A:

The exemplary embodiment also uses median filtering. Median filtering is a common technique that is known in the field of image processing. In another exemplary embodiment, a Gaussian filter may be used as an alternative. FIGS. 9A, 9B and 9C show the results of these types of filters. FIG. 9A shows a 3D contour 910 that has not been filtered. FIG. 9B shows a 3D contour 920 that has been filtered using a median filter. FIG. 9C shows a 3D contour 930 that has been filtered using a Gaussian filter. It will be apparent to those of skill in the art that the filtered contours 920 and 930 present smoother contours than the unfiltered contour 910.

It should be noted that while the exemplary embodiments described herein includes filtering at this stage of the method, other embodiments may include filtering at other stages. For example, in one alternative embodiment, the filtering step may be performed before the triangulating step (e.g., steps 240 and 250 may be performed in reverse order). In another embodiment, the speed filtering step may be performed before the triangulating step (e.g., between steps 230 and 240), while the median filtering step may be performed after the triangulating step as described above.

In step 260, the three-dimensional contour that has been filtered in step 250 (or, in an implementation that does not use filtering, the contour determined in step 240) is used to generate a three-dimensional billboard. This may be accomplished by interpolating a billboard in three dimensions based on the 3D contour points. The exemplary embodiment uses a normalized convolution interpolation technique, as this technique can be quickly computed. However, other embodiments may use other interpolation techniques, such as mean value coordinates and radial basis functions, without departing from the broader principles of the exemplary embodiments. Because the three-dimensional contour provides information only on the silhouette of the subject being depicted, information about the internal shape of the object is lacking. Therefore, the exemplary embodiment further "inflates" the 3D billboard by computing a distance function transform for the object boundary determined by the 3D contour projected into an input camera view, and using this to add depth to the billboard. This technique may provide a useful approximation of the contours of a human subject.

In step 270, an image is projected onto the three-dimensional billboard. The image may be the image from either of the cameras 112 or 114, and may be chosen in any manner, including randomly or arbitrarily. This may be accomplished using standard techniques known in the image processing art. It will be apparent to those of skill in the art that the image may be a still image for a selected point in time, or, alternately, may be a moving image recorded by one of the cameras 112 and 114. Additionally, the exemplary embodiment may result in the projection of a moving image onto a billboard that is recalculated as the images recorded by each of the cameras 112 and 114 change.

FIGS. 10A, 10B, 10C, 10D, 10E and 10F illustrate various types of billboards. FIG. 10A illustrates a planar billboard 1010 generated for a contour 1012 of a subject. FIG. 10B illustrates an image 1014 of the subject projected onto the planar billboard 1010. As may be apparent, the planar billboard possesses shortcomings as described above. Specifically, it should be noted that the back leg of the subject appears too wide and, as a result, it is not readily apparent whether it is behind or in front of the subject. Further, the torso of the subject appears too narrow. FIG. 10C illustrates a three-dimensional billboard 1020 generated for a three-dimensional contour 1022 of the subject. FIG. 10D illustrates an image 1024 of the subject projected onto the three-dimensional billboard 1020. As may be apparent, the three-dimensional billboard better approximates the viewing angle, and it becomes clear that one leg of the subject is behind the other. FIG. 10E illustrates an inflated three-dimensional billboard 1030 generated for the same three-dimensional contour 1022 of the subject. FIG. 10F illustrates an image 1032 of the subject projected onto the inflated three-dimensional billboard 1030. As may be apparent, the inflated billboard gives additional roundness to the subject to make the projection appear more lifelike.

Following step 270, the method 200 terminates. Other embodiments may include additional steps. For example, an alternative embodiment may perform outlier detection that may be useful, for example, for removing shadows of subjects from contours. In such an embodiment, a contour point may be classified as part of a shadow if its height is low and the standard deviation of neighboring points is also low, and such points may be removed from the contour.

Those of skill in the art will understand that the above-described exemplary embodiments may be implemented in any number of matters, including as a software module, as a combination of hardware and software, etc. For example, the exemplary method 200 may be embodied in a program stored in a non-transitory storage medium and containing lines of code that, when compiled, may be executed by a processor.

It will be apparent to those skilled in the art that various modifications may be made to the exemplary embodiments, without departing from the spirit or the scope of the invention. Thus, it is intended that the present invention cover modifications and variations of this invention provided they come within the scope of the appended claims and their equivalents.

What is claimed is:

1. A method, comprising:
   receiving a first image of a scene captured from a first perspective, the first image including an object and a background;
   segmenting the first image to extract a first two-dimensional contour of the object;
   receiving a second image of the scene captured from a second perspective, the second image including the object and the background;
   segmenting the second image to extract a second two-dimensional contour of the object;
   determining a plurality of correspondences, wherein each of the plurality of correspondences matches a first point from the first two-dimensional contour with a second point from the second two-dimensional contour;
   approximating a three-dimensional contour based on the plurality of correspondences;
   generating a three-dimensional billboard of the object based on interpolation of the three-dimensional contour; and
   projecting at least one of the first and second image onto the three-dimensional billboard.

2. The method of claim 1, wherein the approximating comprises determining three-dimensional locations based on the first contour and a constraint of the first contour.

3. The method of claim 2, wherein the constraint is a placement of a first point of the first contour on a known surface.

4. The method of claim 1, further comprising:
   triangulating a best three-dimensional location for each of the plurality of correspondences to approximate the three-dimensional contour.

5. The method of claim 4, wherein the triangulating comprises determining the best three-dimensional location as a closest point of a plurality of rays based on the first point of the correspondence and the second point of the correspondence.

6. The method of claim 1, wherein determining the plurality of correspondences comprises using a dynamic time warping technique on the first two-dimensional contour and the second two-dimensional contour.

7. The method of claim 6, wherein the dynamic time warping technique is a modified dynamic time warping technique.

8. The method of claim 6, wherein the dynamic time warping technique minimizes a value of a global cost function.

9. The method of claim 8, wherein the global cost function comprises a combination of a visual distance between two points and an epipolar distance between the two points.

10. The method of claim 1, further comprising:
    approximating a plurality of three-dimensional locations of a plurality of points on the first contour, and
    filtering the plurality of three-dimensional locations to produce a filtered plurality of three-dimensional locations,
    wherein the three-dimensional billboard is generated based on the filtered plurality of three-dimensional locations.

11. The method of claim 1, further comprising:
    inflating the three-dimensional billboard based on a distance function transform to produce an inflated three-dimensional billboard,
    wherein the first image is projected onto the inflated three-dimensional billboard.

12. A system, comprising:
    an image capture apparatus comprising a first camera, the first camera capturing a first image of a scene from a first perspective, the first image including an object and a background; and
    an analysis apparatus comprising a memory including a set of instructions and a processor executing the set of instructions to perform operations comprising:
    receiving the first image from the image capture apparatus;
    segmenting the first image to extract a first two-dimensional contour of the object;
    wherein the image capture apparatus further comprises a second camera, the second camera capturing a second image of the scene from a second perspective, the second image including the object and the background, and
    wherein the operations further comprise:
    receiving the second image of the scene;

segmenting the second image to extract a second two-dimensional contour of the object;

determining a plurality of correspondences, wherein each of the plurality of correspondences matches a first point from the first two-dimensional contour with a second point from the second two-dimensional contour;

approximating a three-dimensional contour based on the plurality of correspondences;

generating a three-dimensional billboard of the object based on an interpolation of the three-dimensional contour; and projecting at least one of the first and second image onto the three-dimensional billboard.

13. The system of claim 12, wherein the approximating comprises determining three-dimensional locations based on the first contour and a constraint of the first contour.

14. The system of claim 13, wherein the constraint is a placement of a first point of the first contour on a known surface.

15. The system of claim 12,
wherein the approximating the three-dimensional locations comprises:
triangulating a best three-dimensional location for each of the plurality of correspondences to approximate the three-dimensional contour.

16. The system of claim 15, wherein the triangulating comprises determining the best three-dimensional location as a closest point of a plurality of rays based on the first point of the correspondence and the second point of the correspondence.

17. The system of claim 12, wherein determining the plurality of correspondences comprises using a dynamic time warping technique on the first two-dimensional contour and the second two-dimensional contour.

18. The system of claim 17, wherein the dynamic time warping technique is a modified dynamic time warping technique.

19. The system of claim 17, wherein the dynamic time warping technique minimizes a value of a global cost function.

20. The system of claim 19, wherein the global cost function comprises a combination of a visual distance between two points and an epipolar distance between the two points.

21. The system of claim 12, wherein the operations further comprise:
approximating a plurality of three-dimensional locations of a plurality of points on the first contour, and
filtering the plurality of three-dimensional locations to produce a filtered plurality of three-dimensional locations,
wherein the three-dimensional billboard is generated based on the filtered plurality of three-dimensional locations.

22. The system of claim 12, wherein the operations further comprise:
inflating the three-dimensional billboard based on a distance function transform to produce an inflated three-dimensional billboard,
wherein the first image is projected onto the inflated three-dimensional billboard.

23. A non-transitory computer-readable storage medium storing a set of instructions executable by a processor, the set of instructions, when executed by the processor, causing the processor to perform operations comprising:
receiving a first image of a scene captured from a first perspective, the first image including an object and a background;
segmenting the first image to extract a first two-dimensional contour of the object;
receiving a second image of the scene captured from a second perspective, the second image including the object and the background;
segmenting the second image to extract a second two-dimensional contour of the object;
determining a plurality of correspondences, wherein each of the plurality of correspondences matches a first point from the first two-dimensional contour with a second point from the second two-dimensional contour;
approximating a three-dimensional contour based on the plurality of correspondences;
generating a three-dimensional billboard of the object based on interpolation of the three-dimensional contour; and
projecting at least one of the first and second image onto the three-dimensional billboard.

* * * * *